(12) United States Patent
Qi et al.

(10) Patent No.: US 12,476,570 B2
(45) Date of Patent: Nov. 18, 2025

(54) ELECTRIC TRACTION SYSTEM

(71) Applicants: CRRC Zhuzhou Institute Co., Ltd, Hunan (CN); Zhuzhou CRRC Times Electric Co., Ltd., Hunan (CN)

(72) Inventors: Yu Qi, Hunan (CN); Wenqing Mei, Hunan (CN); Liangjie Liu, Hunan (CN); Zechun Dou, Hunan (CN); Xiong Liu, Hunan (CN); Yuecheng Xie, Hunan (CN); Bin Liu, Hunan (CN)

(73) Assignees: CRRC ZHUZHOU INSTITUTE CO., LTD, Hunan (CN); ZHUZHOU CRRC TIMES ELECTRIC CO., LTD., Hunan (CN)

( * ) Notice: Subject to any disclaimer, the term of this patent is extended or adjusted under 35 U.S.C. 154(b) by 234 days.

(21) Appl. No.: 18/552,030

(22) PCT Filed: Jul. 2, 2021

(86) PCT No.: PCT/CN2021/104289
§ 371 (c)(1),
(2) Date: Sep. 22, 2023

(87) PCT Pub. No.: WO2022/205654
PCT Pub. Date: Oct. 6, 2022

(65) Prior Publication Data
US 2024/0171108 A1    May 23, 2024

(30) Foreign Application Priority Data
Apr. 1, 2021 (CN) .......................... 202110355484.1

(51) Int. Cl.
*H02P 25/18* (2006.01)
*B60L 7/14* (2006.01)
(Continued)

(52) U.S. Cl.
CPC ................ *H02P 27/06* (2013.01); *B60L 7/14* (2013.01); *B61C 9/38* (2013.01); *B60L 2210/22* (2013.01); *B60L 2220/54* (2013.01)

(58) Field of Classification Search
CPC .... H02P 27/06; H02P 27/048; H02P 2207/07; H02M 1/007; H02M 1/0077;
(Continued)

(56) References Cited

U.S. PATENT DOCUMENTS

| | | |
|---|---|---|
| 6,431,297 B1 | 8/2002 | Nakazawa |
| 2008/0179999 A1 | 7/2008 | Nakazawa et al. |

(Continued)

FOREIGN PATENT DOCUMENTS

| | | |
|---|---|---|
| CN | 106533191 A | 3/2017 |
| JP | H11511949 A | 10/1999 |

(Continued)

OTHER PUBLICATIONS

Japanese Office Action for JP application No. 2023-560996, dated Nov. 25, 2024, 11 pages.
International Search Report and Written Opinion for International patent application No. PCT/CN2021/104289, dated Dec. 23, 2021, 11 pages.

*Primary Examiner* — Muhammad S Islam
(74) *Attorney, Agent, or Firm* — Tarolli, Sundheim, Covell & Tummino LLP

(57) ABSTRACT

There is provided an electric traction system, comprising: a step-down transformer comprising a primary winding for operatively coupling to an AC power supply and a secondary winding which is inductively coupled to the primary winding; a traction converter module comprising a first input terminal and a second input terminal which are operatively coupled to the secondary winding, and a plurality of AC-to-AC power converters, each of which comprises first and second input nodes, configured to receive AC power and output nodes configured to supply AC power, wherein the (Continued)

first and second input nodes, of the plurality of AC-to-AC power converters are electrically connected in series between the first input terminal and the second input terminal; and at least one electric motor configured to be driven by the traction converter module.

22 Claims, 4 Drawing Sheets

(51) Int. Cl.
    *B61C 9/38*       (2006.01)
    *H02P 27/06*     (2006.01)

(58) Field of Classification Search
    CPC ...... H02M 1/0074; H02M 1/008; H02M 5/40; H02M 1/0067; H02M 5/453
    See application file for complete search history.

(56) References Cited

U.S. PATENT DOCUMENTS

| | | | |
|---|---|---|---|
| 2008/0198637 A1* | 8/2008 | Meysenc | H02M 7/219 363/67 |
| 2015/0343911 A1* | 12/2015 | White | H02M 7/487 318/400.29 |
| 2017/0070175 A1 | 3/2017 | Butzmann et al. | |

FOREIGN PATENT DOCUMENTS

| | | |
|---|---|---|
| JP | 2000245005 A | 9/2000 |
| WO | 2016098178 A1 | 6/2016 |
| WO | 2017056588 A1 | 4/2017 |

* cited by examiner

ELECTRIC TRACTION SYSTEM

CROSS-REFERENCE TO RELATED APPLICATIONS

This application is a U.S. National Stage Application filed under 35 U.S.C. § 371 of PCT/CN2021/104289, filed Jul. 2, 2021, and entitled "ELECTRIC TRACTION SYSTEM", which claims priority from Chinese Patent Application No. 202110355484.1, filed on Apr. 1, 2021. The entire contents of each of the above-identified patent applications are incorporated herein by reference.

TECHNICAL FIELD

The present disclosure relates to an electric traction system. More particularly, but not exclusively, the present disclosure relates to an electric traction system which receives alternating current (AC) power and drives electric motor loads. Such an electric traction system is suitable for use in various power electronics applications, such as, rail transit systems.

BACKGROUND

An electric traction system converts electrical energy into mechanical energy by driving an electric motor using the electrical energy, thereby generating a traction force which causes the propulsion of an electric machine. A typical example of the electric machine is a vehicle (such as, a locomotive, an electric or hydrogen vehicle, an elevator or an electric multiple unit). The electric motor may also be referred to as a traction motor.

An electric traction system may use either a direct current (DC) or an AC power supply. Generally speaking, electric locomotives and long-distance high-speed trains (e.g., multiple units) adopt traction systems supplied with AC power. The AC power is typically supplied by a power grid via an overhead wire, and received by locomotives or trains via a pantograph.

In recent years, the electrification of rail transit systems has continued to advance. Currently, with the continuous improvement of Si-based insulated gate bipolar transistors (IGBTs) with high voltage ratings of 3300-6500V, traction converters based on Si-IGBT devices have been widely used in the electric traction systems of electric locomotives and high-speed multiple units. However, there is a growing demand for highly reliable, low-cost, highly-efficient, lightweight and miniaturised traction systems. However, the development of Si-based IGBTs, on which the existing electric traction systems are based, is slowing down. Therefore, the scope for further improvement in the electric traction systems is relatively limited.

FIG. 1 schematically illustrates a prior electric traction system 100 commonly used in in electric locomotives and high-speed trains. The prior traction system 100 comprises a transformer 135, a traction converter 102 and an electric motor 125. The transformer 135 has a primary winding 136 coupled to a power grid 140 and a secondary winding 137. The traction converter 102 has single-phase AC input terminals 104, 106 which are electrically coupled to two ends of the secondary winding 137 via a pre-charge circuit 130, and three-phase AC output nodes 109 which drive a traction motor 125. The traction motor 125 is commonly a three-phase asynchronous motor or a three-phase permanent magnet synchronous motor. The traction converter 102 comprises a rectifier 113 which converts the received single-phase AC power to DC power, a DC-link capacitor 114 which stores the DC power, and a power inverter 115 which converts the DC power to three-phase AC power.

In an example, the power grid 140 supplies 25 kV AC power, and the transformer 140 steps down the 25 kV provided by the grid to 950V. The 950V-rated AC voltage across the secondary winding 137 corresponds to an intermediate DC voltage with a rating of approximately 1800V across the DC-link capacitor 114. In this voltage regime, the power semiconductor devices used in the rectifier 113 and the inverter 115 of the traction converter 102 are generally 3300V-rated Si-based IGBTs.

In a further example, the power grid 140 still supplies 25 kV AC power, but the transformer 140 steps down the voltage to approximately 1900V. The 1900V-rated AC voltage corresponds to an intermediate DC voltage with a rating of approximately 3600V across the DC-link capacitor 114. In this voltage regime, the power semiconductor devices used in the rectifier 113 and the inverter 115 of the traction converter 102 are generally 6500V-rated Si-based IGBTs. A small number of traction converters for rail vehicles also use 4500V Si-based IGBTs.

High-efficiency, lightweight, and miniaturization have always been the main targets for the development of traction systems in rail transit applications. In addition, it is also desirable to reduce the costs of such traction systems.

Traction converters using 3300V-6500V rated Si-based IGBTs are well developed and there is limited room for weight reduction, miniaturization, and cost saving. In particular, 3300V-6500V rated Si-based IGBTs typically have large-sized packages, high costs, relatively low reliability, relatively high losses and low operating frequencies. Further, the circuit topology of the prior traction converter 102 is inflexible and makes further system optimisation difficult. In addition, the traction converter 102, in particular, the power inverter 115, outputs all of the power required by the traction motor 125. Therefore, the traction converter 102 is subject to high output power requirements, which in turn require the use of power semiconductor devices with high power ratings.

The latest Silicon Carbide (SiC) based power semiconductor devices with 3300V voltage rating or above could replace Si-based IGBTs with the same voltage ratings. Using SiC-based devices within the rectifier 113 and the power inverter 115 may reduce loss, increase efficiency, and contribute to lightweight and miniaturization of the traction converter 102 by reasonably increasing switching frequency. However, costs of SiC-based devices are very high, about ten times that of Si-based IGBTs with the same voltage rating, and reliabilities of such high-voltage SiC-based devices are yet to be verified. Therefore, employing SiC devices within the traction converter 102 is still at prototyping and experimenting stages.

It is an object of the present disclosure, among others, to provide an electric traction system, which provides improvements over known traction systems.

SUMMARY

According to a first aspect of the present disclosure, there is provided an electric traction system, comprising:
  a step-down transformer comprising a primary winding for operatively coupling to an AC power supply and a secondary winding which is inductively coupled to the primary winding;
  a traction converter module comprising a first input terminal and a second input terminal which are operatively coupled to the secondary winding, and a plurality of AC-to-AC power converters, each of which comprises first and second input nodes configured to receive AC power and output nodes configured to supply AC power, wherein the first and second input nodes of the plurality of AC-to-AC power converters are electrically connected in series between the first input terminal and the second input terminal; and at least one electric motor configured to be driven by the traction converter module.

By electrically connecting the first and second input nodes of the plurality of AC-to-AC power converters in series between the first input terminal and the second input terminal, the input sides of the plurality of AC-to-AC power converters collectively share an AC voltage output by the secondary winding of the transformer. As a result, each of the AC-to-AC power converters receives, between its first and second input nodes, a fraction of the magnitude of the AC voltage. Consequently, the AC-to-AC power converters are allowed to use power semiconductor devices with reduced voltage ratings.

For the step-down transformer, the secondary winding has fewer windings than the primary winding, allowing for a decrease in voltage in the exiting electrical stream. The use of the step-down transformer further reduces the AC voltage between the first and second input nodes of each AC-to-AC power converter, thereby allowing the AC-to-AC power converters to use power semiconductor devices with further reduced voltage ratings.

Power semiconductor devices with lower voltage ratings typically have smaller package dimensions, lower prices, and higher maturity than power semiconductor devices with higher voltage ratings. Further, low-voltage power semiconductor devices provide lower switching loss and higher efficiency than high-voltage power semiconductor devices. In addition, low-voltage power semiconductor devices relax cooling and heat exchange requirements, enabling the traction system to have reduced weight, volume and costs.

Therefore, the electric traction system of the present disclosure has a higher efficiency, reduced weight and volume as well as reduced costs as compared to prior electric traction systems.

Further, the circuit topology of the traction converter module has great flexibility for extension and re-configuration. In particular, as compared to the prior electric traction system, it would be much easier to vary the number of AC-to-AC power converters connected in series between the first and second input terminals, and/or to vary the number of electric motor(s) driven by the traction converter module in the traction system according to the present disclosure.

The electric motor may also be referred to as a traction motor (which generates a traction force causing the propulsion of an electric machine). It would also be understood that the electric motor is an AC motor.

With the expression "the first and second input nodes of the plurality of AC-to-AC power converters are electrically connected in series between the first input terminal and the second input terminal", it is meant that the second input node of a power converter is electrically connected to the first input node of a subsequent neighbouring power converter, and/or the first input node of the power converter is electrically connected to the second input node of a precedent neighbouring power converter.

With the expression "at least one electric motor configured to be driven by the traction converter module", it is meant that at least one of the AC-to-AC power converters is configured to supply AC power to the at least one electric motor so as to drive the at least one electric motor.

The term "operatively coupled" or "operatively coupling" used in the present disclosure means that one or more intervening elements may be connected between the coupled elements.

With the expression "a primary winding for operatively coupling to an AC power supply", it is intended to mean that the AC power supply may not be a part of the electric traction system.

It would be appreciated that the plurality of AC-to-AC power converters comprise two or more AC-to-AC power converters.

Each of the plurality of AC-to-AC power converters may be configured to receive single-phase AC power at the input nodes.

One or more of the plurality of AC-to-AC power converters may be configured to supply AC power of three or more phases at the output nodes.

The at least one electric motor may comprise a multi-phase electric motor.

It would be appreciated that the multi-phase electric motor is a single motor which comprises more than three phases, and that the multi-phase electric motor may be driven by one or more of the plurality of AC-to-AC power converters. As compared to a conventional three-phase electric motor, the multi-phase electric motor has a greater fault tolerance because it provides phase redundancy and can operate during phase open fault. Therefore, the use of the multi-phase electric motor improves the reliability of the electric traction system. Further, the multi-phase electric motor achieves higher torque density, reduced amplitude and increased frequency of torque pulsation, higher efficiency, lower DC link current harmonics as well as better noise and vibration characteristic, as compared to a conventional three-phase motor. Further still, the multi-phase electric motor can be controlled with a greater degree of freedom than a conventional three-phase electrical motor, thereby enabling the multi-phase electric motor to achieve greater regulations of torque and the shaft voltage.

The plurality of AC-to-AC power converters may comprise a first AC-to-AC power converter and a second AC-to-AC power converter. The output nodes of the first and second AC-to-AC power converters may be configured to supply AC power to the multi-phase electric motor so as to drive the multi-phase electric motor.

Advantageously, by having the first and second AC-to-AC power converters to collectively drive the multi-phase electric motor, each of the first and second AC-to-AC power converters supplies a fraction of the total power required by the multi-phase electric motor. According, the required power rating of each AC-to-AC power converter as well as the required power ratings of the semiconductor devices used therein may be reduced.

It would be appreciated that the plurality of AC-to-AC power converters may include further power converter(s) in addition to the first and second AC-to-AC power converters. It would also be understood that the terms "first" and "second" are simply used to label the AC-to-AC power converters for the ease of description, and do not imply any limitations to the sequence or locations of the converters within the traction converter module. The first AC-to-AC power converter may or may not be immediately adjacent to the second AC-to-AC power converter.

The first and second AC-to-AC power converters may have identical circuit topologies. Advantageously, the identical circuit topologies allow the first and second AC-to-AC power converters to achieve power matching by supply an equal amount of power to the multi-phase electric motor.

The multi-phase electric motor may comprise a first set of stator windings and a second set of stator windings. The output nodes of the first AC-to-AC power converter may be electrically coupled to the first set of stator windings, and the output nodes of the second AC-to-AC power converter may be electrically coupled to the second set of stator windings.

The term "electrically coupled" used in the present disclosure means that one or more intervening elements (e.g., electrical contacts) may be connected between the coupled elements.

It would be appreciated that the multi-phase electric motor may include further set(s) of stator windings.

The first set of stator windings and the second set of stator windings may be electrically isolated from one another. Advantageously, the electrical isolation between the sets of stator windings improves system reliability.

The first AC-to-AC power converter may be configured to output a first number of phases of AC power at its output nodes. The first number of phases may be identical to a number of phases of the first set of stator windings.

The first number of phases may be equal to or greater than three phases.

A number of the output nodes of the first AC-to-AC power converter may be identical to the first number of phases.

Alternatively, the number of the output nodes of the first AC-to-AC power converter may be two times the first number of phases. This arrangement may be adventurously for driving open-ended stator windings.

The first set of stator windings may be connected in a wye or delta configuration. Alternatively, the first set of stator windings may be open-ended stator windings which require power to be supplied from both ends.

The second AC-to-AC power converter and the second set of stator windings may have features similar to those described above for the first AC-to-AC power converter and the first set of stator windings.

The plurality of AC-to-AC power converters may have identical circuit topologies. Advantageously, the identical circuit topologies allow the plurality of AC-to-AC power converters to equally share the voltage of the AC power supply.

At least one of the plurality of AC-to-AC power converters may comprise a rectifier, a DC-link capacitor and a power inverter. The at least one of the plurality of AC-to-AC power converters may also be referred to as an indirect power converter or an AC-DC-AC power converter.

One or each of the rectifier and the power inverter may comprise at least one power semiconductor device.

The at least one power semiconductor device may comprise one or more of a Si-based power semiconductor device or a SiC-based power semiconductor device or a GaN-based power semiconductor device.

The power inverter may comprise a plurality of inverter legs connected between two ends of the DC link capacitor. The plurality of inverter legs may provide the output nodes of the respective AC-to-AC power converter.

Each inverter leg may comprise at least one power semiconductor device.

The electric traction system may further comprise a controller which is configured to control on and off statuses of the at least one power semiconductor device so as to convert the AC power received at the input nodes of the respective AC-to-AC power converter to the AC power at its output nodes during a traction mode of the traction system.

The controller may be further configured to control on and off statuses of the power semiconductor devices of the respective AC-to-AC power converter so as to convert mechanical energy of the at least one electric motor to electrical energy at the secondary winding during a braking mode of the traction system. The electrical energy may be returned to the primary winding and further to the AC power supply.

At least one of the plurality of AC-to-AC power converters may further comprise a bypass switch connected between the first and second input nodes of the respective AC-to-AC power converter.

The at least one of the plurality of AC-to-AC power converters may be configured such that when the bypass switch is in an OFF state (i.e., open), the respective converter is activated and that when said bypass switch is in an ON state (i.e., closed), the respective converter is deactivated.

The plurality of AC-to-AC power converters may further comprise a redundant AC-to-AC power converter. The redundant AC-to-AC power converter may comprise a bypass switch connected between its first and second input nodes.

The multi-phase electric motor may comprise a redundant set of stator windings, and the output nodes of the redundant AC-to-AC power converter may be electrically coupled to the redundant set of stator windings.

The redundant AC-to-AC power converter may be configured to replace a faulty one of the plurality of AC-to-AC power converters.

The traction converter module may be configured such that when the plurality of AC-to-AC power converters are fault-free, the bypass switch of the redundant AC-to-AC power converter are in an ON state (i.e., closed), and the bypass switches of other power converters are in an OFF state (i.e., open), and that when fault occurs, the bypass switch of the faulty AC-to-AC power converter is switched to the ON state and the bypass switch of the redundant AC-to-AC power converter is switched to the OFF state.

The controller may be configured to control on and off statuses of the bypass switches.

The electric traction system may further comprise a pre-charge circuit electrically connected between the secondary winding and the traction converter module. The pre-charge circuit may be configured to charge the DC-link capacitor prior to normal operation of the traction converter module.

The pre-charge circuit may comprise a charging resistor, and may be configured to charge the DC-link capacitor via the charging resistor.

The pre-charge circuit may further comprise a first switch and a second switch. The second switch may be connected in series with said charging resistor. The first switch may be connected in parallel to the second switch and the charging resister.

The transformer may comprise a line frequency transformer.

It would be understood that a line frequency transformer is a transformer that operates at line frequencies (which may also be referred to as utility frequencies, e.g., 50 Hz or 60 Hz).

According to a second aspect of the present disclosure, there is provided an electric machine comprising an electric traction system according to the first aspect.

The electric machine may comprise a vehicle. The vehicle may be selected from a group consisting of an electric locomotive, an electric train, and an electric multiple unit.

Alternatively, the electric machine may comprise an industrial apparatus.

According to a third aspect of the present disclosure, there is provided a power electronics system, comprising an AC power supply and an electric traction system according to the first aspect, wherein the primary winding is operatively coupled to the AC power supply.

According to a fourth aspect of the present disclosure, there is provided a rail transit system, comprising: an AC power supply and a vehicle comprising an electric traction system according to the first aspect, wherein the primary winding of the electric traction system is operatively coupled to the AC power supply.

Where appropriate any of the optional features described above in relation to one of the aspects of the present disclosure may be applied to another one of the aspects of the disclosure.

BRIEF DESCRIPTION OF THE DRAWINGS

In order that the disclosure may be more fully understood, a number of embodiments of the disclosure will now be described, by way of example, with reference to the accompanying drawings, in which.

In the figures, like parts are denoted by like reference numerals.

It will be appreciated that the drawings are for illustration purposes only and are not drawn to scale.

DETAILED DESCRIPTION OF THE PREFERRED EMBODIMENTS

Figure 1:
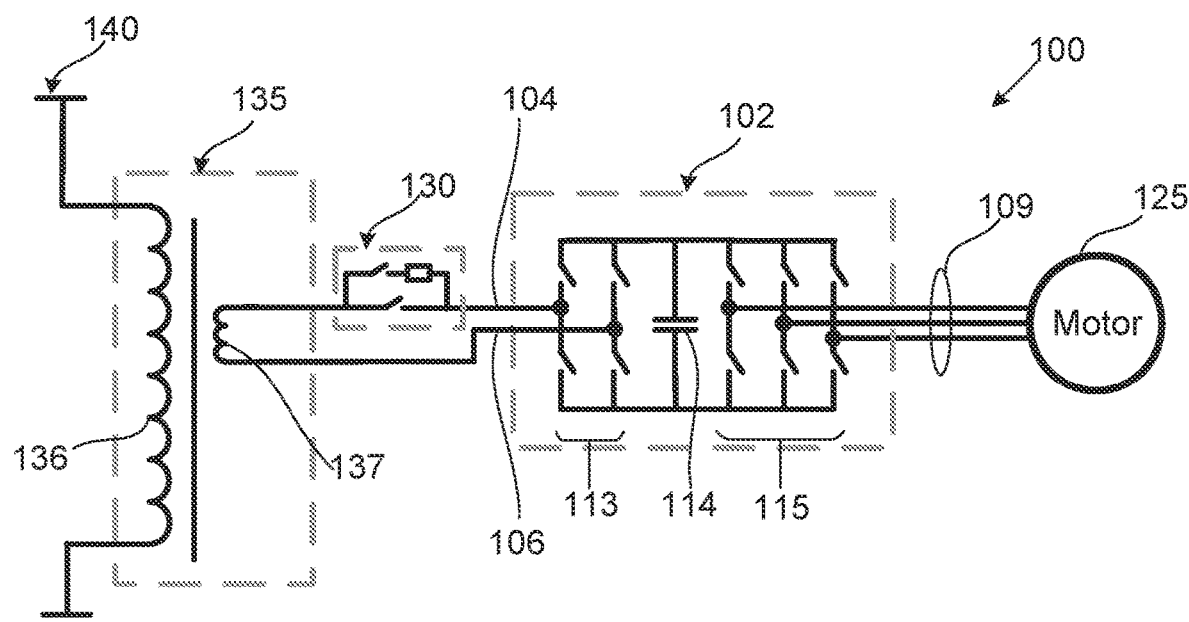
FIG. 1 is a schematic circuit diagram of a prior electric traction system.
Figure 2:
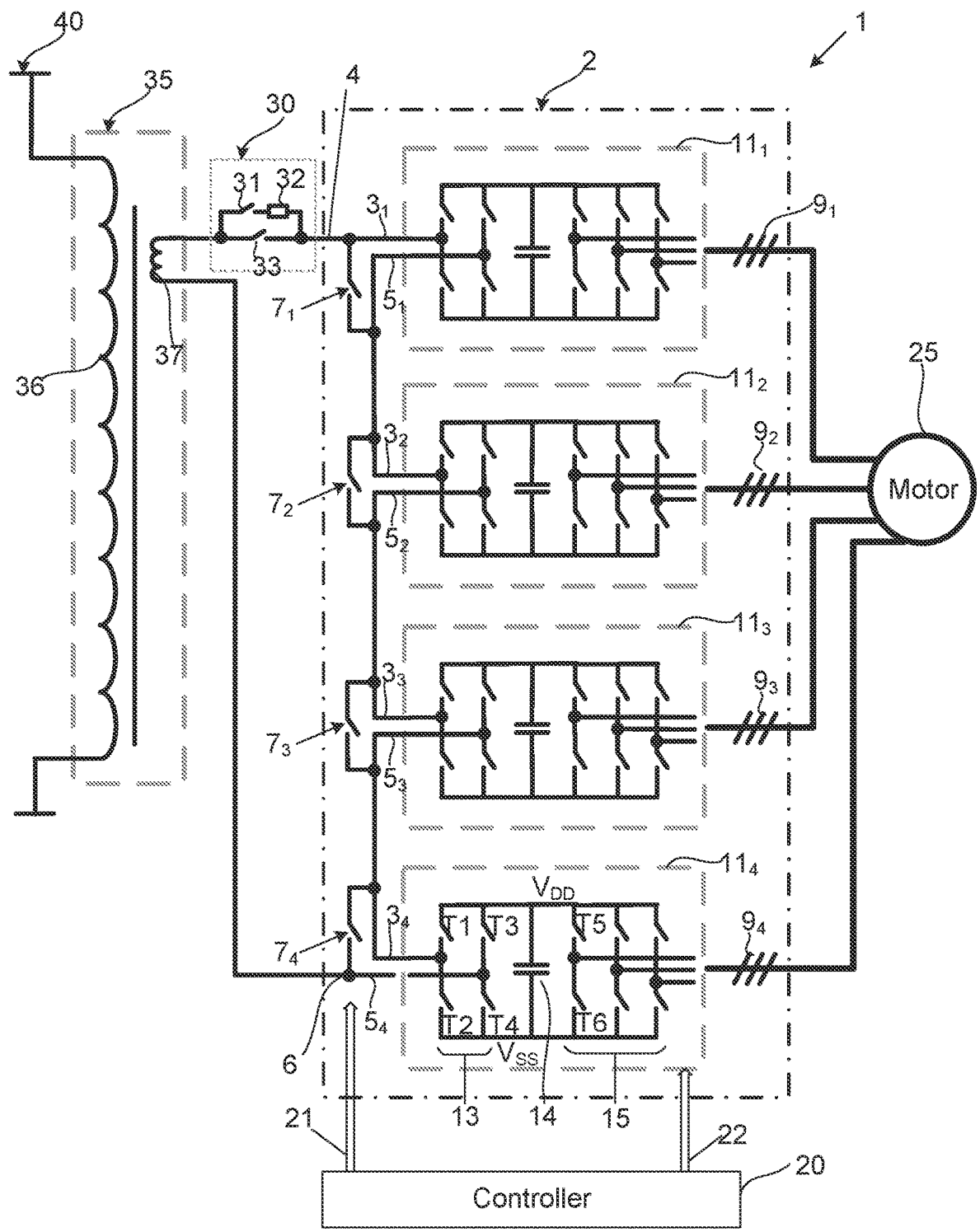
FIG. 2 is a schematic circuit diagram of an electric traction system according to a first embodiment of the present disclosure.

FIG. 2 schematically illustrates a circuit diagram of an electric traction system 1 (referred to as "traction system" below) according to a first embodiment of the present disclosure. The traction system 1 uses a traction converter module 2 to replace the traction converter 102 used in the prior traction system 100. The traction converter module 2 converts single-phase AC power to multi-phase AC power for driving an electric motor 25. The traction system 1 further comprises a step-down transformer 35 which has a primary winding 36, which in use is electrically coupled to an AC power supply 40 and a secondary winding 37 which has less turns than the primary winding 36. Thus, the transformer 35 steps down the high voltage provided by the AC power supply 40 to a lower voltage. The AC power supply 40 may be a power grid. The AC power supplied by the power grid typically has a frequency of 50 Hz or 60 Hz, i.e., the line frequency or the utility frequency. Accordingly, the step-down transformer 35 may be a line frequency transformer, meaning that it operates at the line frequency (i.e., 50 Hz or 60 Hz). It would be appreciated that the AC power supply 40 may take a different form depending upon the particular application of the traction system 1, and that the transformer 35 may operate at a different frequency. Apart from performing voltage stepping-down, the transformer 35 takes power or feed power to the AC power supply 40, and provides electrical isolation between the traction converter module 2 and the AC power supply 40.

The traction converter module 2 includes a first input terminal 4 and a second input terminal 6, which are electrically coupled to two ends of the secondary winding 37, respectively. A pre-charge circuit 30 is electrically connected in series between the first input terminal 4 and one end of the secondary winding 37. With reference to FIG. 2, the traction converter module 2 includes four AC-to-AC power converters (referred to as "AC/AC converters" below) $11_1, \ldots 11_4$ (which are collectively referred to as 11), each of which is similar to the traction converter 102. Each AC/AC converter $11_i$ (i=1, . . . 4) includes a first input node $3_i$ and a second input node $5_i$ which receive single-phase AC power, a switch $7_i$ connected between the input nodes, and three output nodes $9_i$ which supply three-phase AC power for driving motor loads.

The first and second input nodes 3, 5 of the AC/AC converters 11 are electrically connected in series between the first input terminal 4 and the second input terminal 6. In particular, the second input node $5_i$ (i=2 or 3) of an AC/AC converter $11_i$ is electrically connected to the first input node $3_{i+1}$ of a subsequent AC/AC converter $11_{i+1}$, and the first input node $3_i$ of the AC/AC converter $11_i$ is electrically connected to the second input node $5_{i-1}$ of a precedent AC/AC converter $11_{i-1}$. The AC/AC converter $11_1$ at the front of the array of AC/AC converters 11 has its first input node 31 electrically connected to the first input terminal 4. The AC/AC converter $11_4$ at the rear of the array of AC/AC converters 11 has its second input node $5_4$ electrically connected to the second input terminal 6.

The switches 7 function as bypass switches, and can be used to activate or deactivate corresponding AC/AC converters 11. When a switch $7_i$ (e.g., $7_4$ in FIG. 2) is closed (i.e., at the ON status), the first and second input nodes $3_i$ and $5_i$ of the corresponding AC/AC converter $11_i$ are electrically shorted together. As a result, the AC/AC converter $11_i$ receives no AC power and thus is deactivated. Conversely, an open (i.e., OFF) switch $7_i$ (e.g., $7_1$, $7_2$ or $7_3$ in FIG. 2) allows a corresponding AC/AC converter $11_i$ to function normally as an active converter. In an example, the AC/AC converter $11_4$ is a redundant converter with its bypass switch $7_4$ normally closed, and the remaining three AC/AC converters $11_1$ to $11_3$ are active converters with their bypass switches normally open.

As shown in FIG. 2, each of the AC/AC converters 11 comprise a rectifier 13, a DC-link capacitor 14 and a power inverter 15. The rectifier 13 comprises four power semiconductor devices (illustrated as switches) T1 to T4. The devices T1 and T4 may be switched on to allow the positive half of the input AC wave to charge the DC-link capacitor 14, while the devices T2 and T3 may be switched on to allow the negative half of the input AC wave to charge the DC-link capacitor 14. While the rectifier 13 is illustrated as a single-phase two-level full-bridge four-quadrant rectifier, the rectifier 13 may take any suitable form which is not limited to the example shown in FIG. 2. The power inverter 15 comprises three inverter legs each providing an output node. The three inverter legs have identical structures. For simplicity, the description below describes the structure of the first inverter leg only. The first inverter leg comprises two power semiconductor devices T5 and T6 connected between two ends (i.e., $V_{DD}$, $V_{SS}$) of the DC-link capacitor 14, with its output node being between the two devices T5, T6. By controlling the power semiconductor devices of the three inverter legs to switch on and off at different times, the AC power provided at the three output nodes 9 has three different phases. Further, while the power inverter 15 is shown as a two-level three-phase full-bridge inverter, the inverter 15 may be implemented using different circuit topologies, e.g., three-level, multi-level, half-bridge etc. Further, the phase number of the inverter 15 may be different from three by adjusting the number of the inverter legs. FIG. 2 shows that a single power semiconductor device is provided between each input node $3_i$, $5_i$ and each output node $9_i$, on the one hand, and each of the voltage nodes $V_{DD}$, $V_{SS}$ on the other hand. It would be understood that this is just for conceptual clarity, and that more than one power semiconductor device may be provided and may be electrically connected in series or in parallel between each input/output node and each of the voltage nodes $V_{DD}$, $V_{SS}$.

With reference to the traction system 1 of FIG. 2, the active AC/AC converters 11 which have open switches 7 collectively share an AC voltage received between the first and second input terminals 4, 6. The voltage drop across the input nodes $3_i$, $5_i$ of each active AC/AC converter $11_i$ is merely a fraction of the AC voltage received between the terminals 4, 6. As compared to the prior converter 102, each of the AC/AC converters 11 can be constructed by using power semiconductor devices with much lower voltage ratings. This also expands the choice of power semiconductor devices beyond Si-based IGBTs and SiC-based devices. For example, Si-based metal-oxide-semiconductor field effect transistors (MOSFETs) and Gallium nitride (GaN) based MOSFETs may be used to construct the AC/AC converters 11.

In an example, the AC power supply 40 supplies 25 kV AC power, and the transformer steps down the high voltage provided by the AC power supply 40 to a 950V-rated AC voltage across the secondary winding 37. In the event that the redundant AC/AC converter $11_4$ is bypassed, the rated AC input voltage for each active AC/AC converter $11_1$ to $11_3$ is 316.7V, which corresponds to an intermediate DC voltage with a rating of approximately 750V across the DC-link capacitor 14. In this voltage regime, the power semiconductor devices used in the active AC/AC converters $11_1$ to $11_3$ are generally 1200V-rated devices rather than 3300V-rated devices used in the prior traction system 100. Examples of 1200V-rated power devices include Si-based IGBTs, Si-based MOSFETs, SiC-based MOSFETs, GaN-based MOSFETs, or other semiconductor-based power devices.

In the event that there are only two active AC/AC converters which are electrically connected in series between the input terminals 4, 6, the rated AC input voltage for each active AC/AC converter would be 475V, which corresponds to an intermediate DC voltage with a rating of approximately 1050V across the DC-link capacitor 14. In this voltage regime, the power semiconductor devices used in the active AC/AC converters are generally 1700V-rated devices in contrast to 3300V-rated Si-based IGBTs used in the prior traction system 100. Examples of 1700V-rated power devices include Si-based IGBTs, Si-based MOSFETs, SiC-based MOSFETs, GaN-based MOSFETs, or other semiconductor-based power devices.

Power semiconductor devices with lower voltage ratings typically have smaller package dimensions, lower prices, and higher maturity than power semiconductor devices with higher voltage ratings. Further, low-voltage power semiconductor devices provide lower switching loss and higher efficiency than high-voltage power semiconductor devices.

In addition, low-voltage power semiconductor devices relax cooling and heat exchange requirements, enabling the traction system 1 to have reduced weight, volume and costs. Because the traction system 1 allows the use of lower rating power semiconductor devices by improving the circuit structure, rather than requiring a lower rating AC power supply, the traction system 1 may use the same AC power supply as the prior traction system 100. Accordingly, the traction system 1 may directly replace the existing traction system 100 in rail transit applications.

The traction system 1 further includes a controller 20. The controller 20 controls the on/off switching of the bypass switches 7 using signal lines 21. The controller 20 also controls the on/off switching of power semiconductor devices within each AC/AC converter 11 using signal lines 22. As a result, the functioning of each AC/AC converter 11 can be independently controlled by the controller 20. The switches 7 may be implemented as gate controlled power switches, e.g., MOSFETs or IGBTs, or current controller power switches, e.g., thyristors. The controller 20 may comprise a controlling unit (such as, a processor, a programmable logic device, and/or an application-specific integrated circuit (ASIC) etc.) as well as driver circuitry for transforming low-current control signals output by the controlling unit to higher-current control signals. While FIG. 2 shows that the controller 20 is part of the traction system 1, it would be appreciated that the controller may alternatively be an external component of the traction system 1.

The pre-charge circuit 30 is electrically connected in series between an end of the secondary winding 37 and the first input terminal 4. The pre-charge circuitry 30 includes a first switch 33, and a second switch 31 in series connection with a pre-charge resistor 32. The first switch 33 is in parallel connection with the second switch 31 and the resistor 32. Prior to normal operation of the traction converter module 2, the second switch 31 is closed while the first switch 33 is kept open. In this way, the DC-link capacitors 14 of the AC/AC converters 11 can be charged through the pre-charge resistor 32. Once pre-charging of the DC-link capacitors 14 is completed, the pre-charge resistor 32 is bypassed by closing the first switch 33 and opening the second switch 31. The voltage drop across the first switch 33 would be negligible. Therefore, the magnitude of the AC voltage across the first and second input terminals 4, 6 would be substantially identical to the magnitude of the AC voltage provided by the secondary winding 37. Pre-charging the DC-link capacitors 14 is useful for preventing excessive inrush current at system start-up which may damage the DC-link capacitors 14 and the power semiconductor devices (e.g., T1 to T4) of the AC/AC converters 11.

The traction system 1 also includes an electric motor 25, which is an AC motor. The stator windings of the motor 25 are electrically coupled to the output nodes 9 of the AC/AC converters 11. As a result, the traction converter module 2 drives the motor 25 by supplying AC power to the motor 25. The motor 25 typically generates a traction force causing the propulsion of an electric machine (e.g., a vehicle or an industrial machine etc.), and thus may be referred to as a traction motor. The motor 25 may take the form of an asynchronous motor or a permanent magnet synchronous motor.

In terms of the number of phases, the electric motor 25 is a multi-phase electric motor. A multi-phase motor generally has more than three phases (e.g., five to twelve phases). For a conventional three-phase motor (such as the motor 125), if one of the phases is lost, the rotatory field within the motor also disappears and the motor would stop working. As compared to conventional three-phase motors, the multi-phase motor 25 has a greater fault tolerance because it provides phase redundancy and can operate during phase open fault. Therefore, the use of the multi-phase motor 25 enables the traction system 1 to have a higher reliability. Further, the multi-phase motor 25 achieves higher torque density, reduced amplitude and increased frequency of torque pulsation, higher efficiency, lower DC link current harmonics as well as better noise and vibration characteristic, as compared to a conventional three-phase motor. Further, the multi-phase electric motor 25 can be controlled with a greater degree of freedom than a conventional three-phase electrical motor, thereby enabling the motor 25 to achieve greater regulations of torque and the shaft voltage.

The circuit topology of the traction converter module 2 is particular suitable for driving the multi-phase electric motor 25. In the event that the AC/AC converter 11₄ is a redundant converter with its bypass switch 7₄ normally closed, three active AC/AC converters 11₁ to 11₃ drive the motor 25 together. This may be achieved by electrically coupling the output nodes 9₁, 9₂, 9₃ of each active AC/AC converter to a respective set (e.g., three phases or more) of stator windings of the motor 25, such that each active AC/AC converter drives the respective set of stator windings. Each active AC-to-AC power converter outputs a number of phases of AC power at its output nodes. Preferably, the number of phases (e.g., equal to or more than three) output by an AC/AC converter is identical to the number of phases of the set of stator windings driven thereby. Therefore, each AC/AC converter 11₁ to 11₃ supplies a fraction of the total power required by the motor 25. By further making the AC/AC converters driving the motor 25 to have identical circuit topologies, each of the AC/AC converters supplies an equal amount of power (e.g., a third of the total power required by the motor 25) to a respective set of stator windings of the motor 25 and thus achieves power matching with respect to one another.

The sets of stator windings within the motor 25 may be electrically isolated from one another, by for example having separated neutral points. The electrical isolation between the sets of stator windings is useful for improving system reliability. Alternatively, the sets of stator windings within the motor 25 may share the same neutral points. The multiple sets of stator windings can be independently controlled, and thus allow a higher degree of control freedom for optimising torque and shaft voltage of the motor 25.

As described above, the AC/AC converter 11₄ may be a redundant converter which is normally deactivated. The multi-phase electric motor 25 may also be configured with redundancy. With reference to FIG. 2, the motor 25 includes a redundant set of stator windings which are electrically coupled to the output nodes 9₄ of the redundant AC/AC converter 11₄. During normal operation, the bypass switch 7₄ of the AC/AC converter 11₄ is kept closed by the controller 20 so as to deactivate the redundant AC/AC converter 11₄. Meanwhile, the switches 7₁ to 7₃ of the AC/AC converters 11₁ to 11₃ are kept open by the controller 20. As such, the AC/AC converters 11₁ to 11₃ drive the motor 25 collectively. In the event that faults occur in one of the AC/AC converter 11₁ to 11₃ or the stator windings driven thereby, the controller 20 closes the switch 7ⱼ (j=1, 2 or 3) of the faulty branch, and opens the switch 7₄ of the redundant AC/AC converter 11₄ so as to activate the redundant AC/AC converter 11₄. Thus the redundant AC/AC converter 11₄ drives the motor 25 with the other two active inverter(s). This redundancy mechanism provided by the multi-phase electric motor 25 and the traction converter module 2 allows the traction system 1 to continue functioning in the event of faults occurring in the stator windings of the motor 25 or the AC/AC converters 11, thereby significantly improving the reliability of the traction system 1.

In an example, the motor 25 is designed as a 12-phase motor but operates as a 9-phase motor, with the other three phases being redundant phases. The motor 25 may have a rated power of 600 kW. Under normal operation, each of the active AC/AC converter 11₁ to 11₃ supplies 200 kW of power to the motor 25. In particular, each rectifier 13 rectifies the AC input power received by each active AC/AC converter with a power factor of about 1.0 to achieve a DC-link voltages of 750V. Each DC-link voltage is inverted by each inverter 15 into three-phase AC power with variable frequency and variable fundamental magnitude to drive a set of three-phase stator winding of the motor 25. In this process, electrical power is converted into mechanical power. This working mode of the traction system 1 may also be referred to as a traction mode.

The traction system 1 may also have a braking mode in which mechanical power of the motor 25 is converted to electrical power in a controller way. In particular, the motor 25 functions as an electric generator generating AC power, and the generated AC power is fed back into the nodes 9 of the traction converter module 2. The AC/AC converters 11 of the traction converter module 2 are controlled by the controller 20 to convert AC power received at the nodes 9 to AC power for outputting at the nodes 3, 5. During this process, the inverter 15 functions as a rectifier while the rectifier 13 functions as an inverter. The AC power output by the node 3, 5 is then moved to the secondary winding 37, and reverted to the AC power supply 40 via the primary winding with a power factor of about −1.0.

It would be understood that during the traction mode and the braking mode, power flows through the AC/AC converters 11 in opposite directions. The controller 20 controls the working modes of the AC/AC converters 11 as well as the directions of power flow through the AC/AC converters 11. Each of the AC/AC converters 11 independently controls power flow into/from the respective set of stator windings which are electrically coupled to the converter.

Although it is not shown in FIG. 2, electrical contacts may be connected between one or more output nodes 9 of at least one AC/AC converter 11 and respective stator winding(s) of the motor 25. An electrical contact is an electrical circuit component commonly found in electrical switches, relays, connectors and circuit breakers. Each contact is a piece of electrically conductive material, typically metal. When a pair of electrical contacts touch, they can pass an electrical current and allow the corresponding output node 9 and the stator winding to be electrically connected.

While FIG. 2 shows that the traction converter module 2 includes four AC/AC converters 11 which are electrically connected in series at their input sides, it would be understood that this is just for illustration and in no way imply any limitation to the number of AC/AC converters 11. Indeed, having at least two AC/AC converters 11 connected in series at the input sides would allow the traction converter module 2 to achieve the advantages described above.

While FIG. 2 shows that the traction system of FIG. 2 includes a single motor 25, it will be appreciated that one or more further motor(s) may be employed. The further motor(s) may be driven by extra AC/AC converter(s) of the traction converter module 2. The further motor(s) may comprise a conventional three phase motor driven by a single AC/AC converter or a multi-phase electric motor similar to the motor 25 that is driven by one or more AC/AC converters.

It will also be understood that the bypass switches 7 may be omitted such that all of the AC/AC converters 11 are active AC/AC converters.

It is preferable that the AC/AC converters 11 within the traction converter module 2 are identical to one another (i.e., having an identical circuit topology with identical device parameters), so that the active AC/AC converters 11 would equally share the AC voltage between the first and input terminals 4, 6, and output identical AC currents at the output nodes. However, it would be appreciated that this arrangement is not necessary.

The AC/AC converters 11 shown in FIG. 2 are AC-DC-AC converters which convert input AC power to intermediate DC power, which is in turn converted to AC power for output. It would be appreciated that the AC/AC converters 11 may have any suitable circuit topologies as long as they adjust one or more of the phase, frequency and magnitude of the input AC power in generating the output AC power. For example, the AC/AC converters 11 may directly convert input AC power to output AC power without requiring any conversion to intermediate DC power. Alternatively, the AC/AC converters 11 may perform AC-DC-AC conversion for more than one time.

Figure 3:
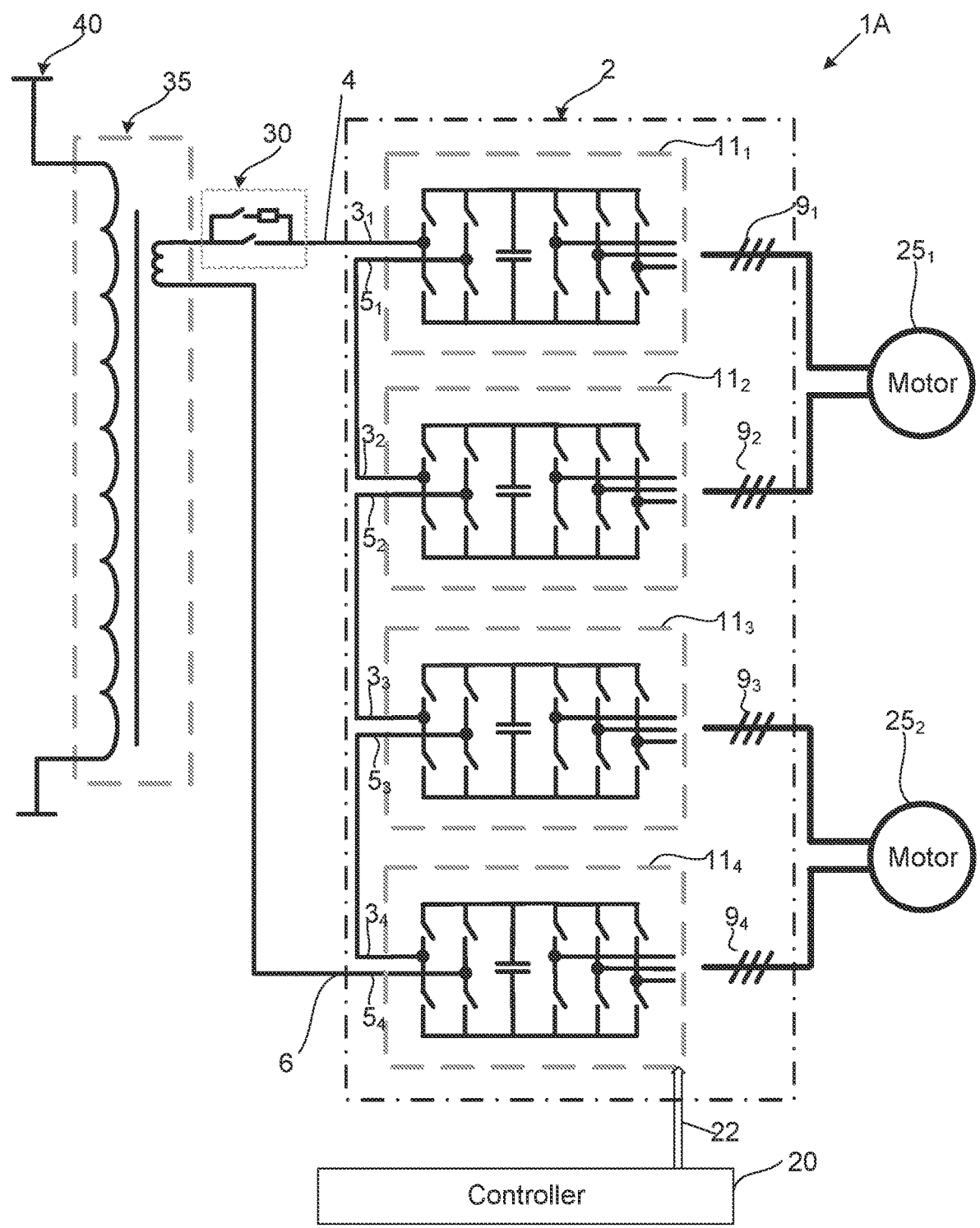
FIG. 3 is a schematic circuit diagram of an electric traction system according to a second embodiment of the present disclosure.

The traction system 1 of FIG. 2 is flexible for extension, by for example varying the number of AC/AC converters connected in series between the input terminals 4, 6 and/or by varying the number of motors driven by the traction converter module. FIG. 3 schematically illustrates a circuit diagram of an electric traction system 1A according to a second embodiment of the present disclosure. Elements of the traction system 1A that are identical to those of the traction system 1 are identified using the same labels. Elements of the traction system 1A that correspond to, but are different from those of the traction system 1 are labelled using the same numerals but with a letter 'A' for differentiation. The features and advantages described above with reference to the first embodiment are generally applicable to the second embodiment.

The traction system 1A differs from the traction system 1 in that the traction converter module 2 drives two multiphase motors $25_1$ and $25_2$, each of which is a 6-phase motor (e.g., dual three-phase motor). The AC/AC converters $11_1$ and $11_2$ collectively drive the motor $25_1$. The AC/AC converters $11_3$ and $11_4$ collectively drive the motor $25_2$. In the traction system 1A, all of the AC/AC converters are active converters. Thus, the bypass switches are omitted from FIG. 3.

While the examples provided by FIGS. 2 and 3 include multi-phase motor(s) 25 each of which being driven by at least two AC/AC converters, it would be appreciated that one or more of the multi-phase motor(s) may alternatively be driven by a single AC/AC converter which outputs multiple phases of AC power. It would also be appreciated that the traction converter module 2 may also be used to drive one or more conventional three-phase motors, and that each three-phase motor may be driven by a single AC/AC converter.

In the examples provided by FIGS. 2 and 3, in order to drive a set of three-phase stator windings of a traction motor, the respective AC/AC converter has three output nodes each supplying one phase of AC power to a corresponding phase of the traction motor. This arrangement may be suitable when the motor windings are connected in star (i.e., wye) or delta configuration. In the event that the traction motor has open-end stator windings, an AC/AC converter 11A or 11B as shown in FIGS. 4 and 5 may be used to replace each of the AC/AC converters 11 of FIGS. 2 and 3.

Figure 4:
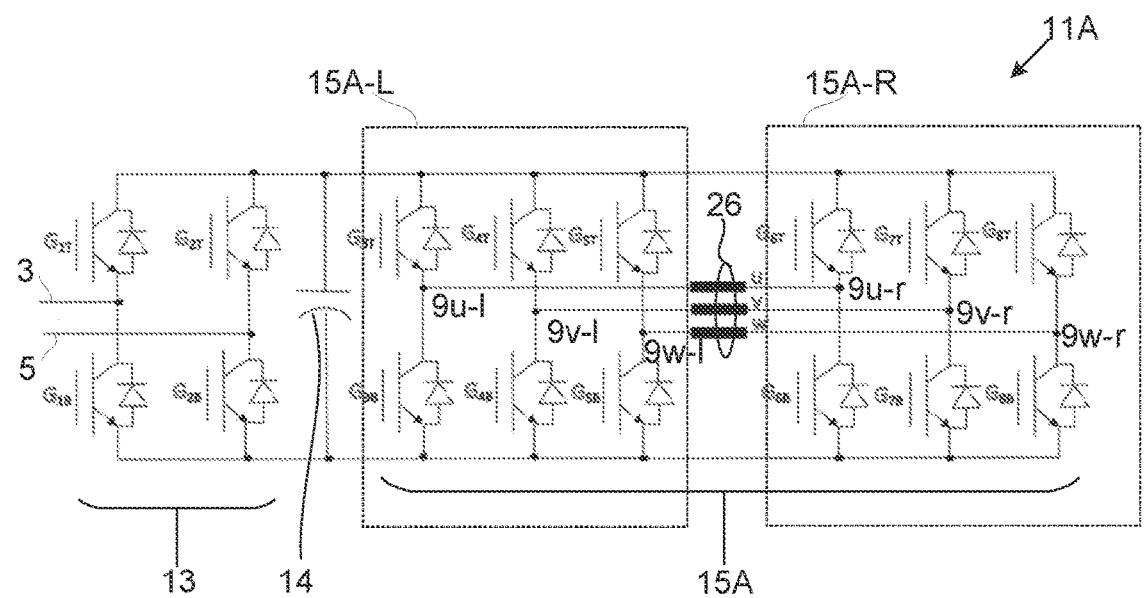
FIG. 4 is a schematic circuit diagram of an AC-to-AC power converter which may be used in the electric traction system of FIG. 2 or FIG. 3.

As shown in FIG. 4, the AC/AC converter 11A comprises a first input node 3, a second input node 5, a rectifier 13, a DC-link capacitor 14 and a power inverter 15A. The AC/AC converter 11A differs from the converter 11 in the configuration of the power inverter 15A. More specifically, the power inverter 15A includes three pairs of inverter legs which have identical structures. For simplicity, the description below describes the structure of the first pair of inverter legs only. The first pair of inverter legs comprises two power semiconductor devices $G_{3T}$ and $G_{3B}$ connected in series between two ends of the DC-link capacitor 14, an output node $9u$-$l$ between the devices $G_{3T}$ and $G_{3B}$, two further power semiconductor devices $G_{6T}$ and $G_{6B}$ connected in series between two ends of the DC-link capacitor 14, and an output node $9u$-$r$ between the devices $G_{6T}$ and $G_{6B}$. A stator winding is connected between the pair of output nodes $9u$-$l$, $9u$-$r$, which supply AC power to the stator winding at both ends. FIG. 4 shows a set of three-phase stator windings 26. To drive the three-phase stator windings 26, three pairs of inverter legs are employed, generating three pairs of output nodes.

The power inverter 15A may also be considered as being a combination of two power inverters 15A-L, 15A-R connected at opposite sides of the stator windings 26. The two power inverters 15A-L, 15A-R share the same DC-link capacitor 14. Each of the inverters is a two-level three-phase full-bridge power inverter that is similar to the power inverter of FIG. 2.

Figure 5:
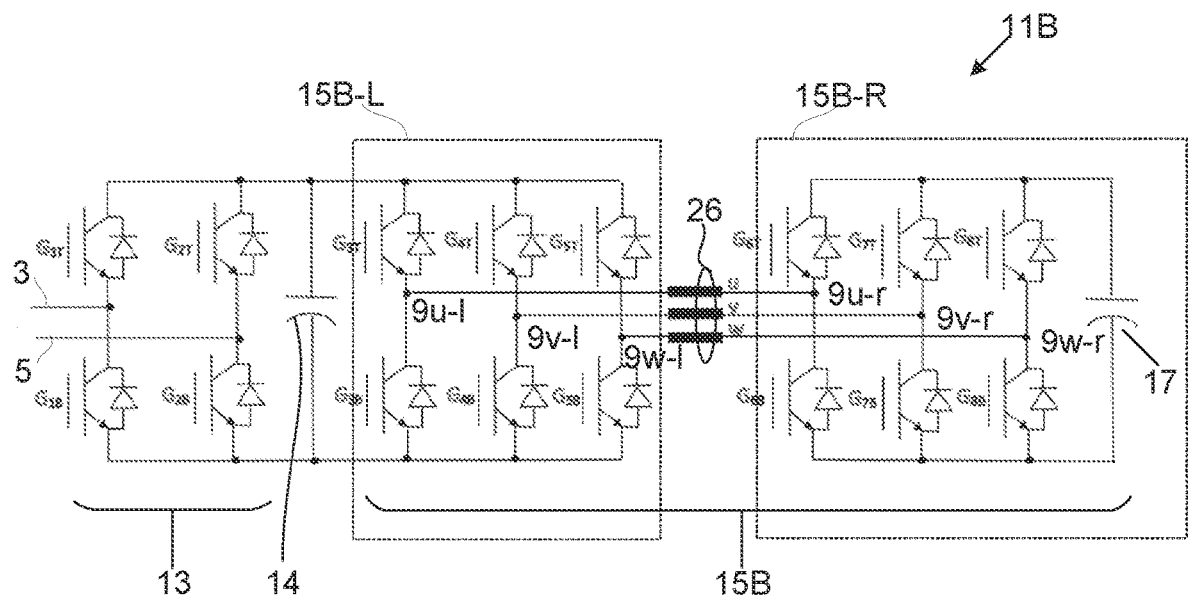
FIG. 5 is a schematic circuit diagram of another AC-to-AC power converter which may be used in the electric traction system of FIG. 2 or FIG. 3.

With reference to FIG. 5, the AC/AC converter 11B differs from the converter 11 in the configuration of the power inverter 15B. Similar to the power inverter 15A, the power inverter 15B may also be considered as being a combination of two power inverters 15B-L, 15B-R arranged at opposite sides of the stator windings 26. However, the three inverter legs of the inverter 15B-R are connected at two ends of a floating capacitor 17 rather than the DC-link capacitor 14.

The traction systems 1, 1A of the present disclosure may be part of an electric machine. Typical examples of the electric machine include a vehicle (such as, an electric locomotive or an electric multiple unit) and an industrial apparatus. It would be understood that the AC power supply 40 may not be a part of the traction system 1, 1A or the electric machine.

While the traction systems 1, 1A of the present disclosure are particularly suitable for use in rail transit applications, they can also be used in any power electronics traction system which uses an AC power supply to drive AC electric motor loads.

The terms "having", "containing", "including", "comprising" and the like are open and the terms indicate the presence of stated structures, elements or features but not preclude the presence of additional elements or features. The articles "a", "an" and "the" are intended to include the plural as well as the singular, unless the context clearly indicates otherwise.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. An electric traction system, comprising:
    a step-down transformer comprising a primary winding for operatively coupling to an AC power supply and a secondary winding which is inductively coupled to the primary winding;
    a traction converter module comprising a first input terminal and a second input terminal which are operatively coupled to the secondary winding, and a plurality of AC-to-AC power converters, each of which comprises first and second input nodes configured to receive AC power and output nodes configured to supply AC power, wherein the first and second input nodes of the plurality of AC-to-AC power converters are electrically connected in series between the first input terminal and the second input terminal; and
    at least one electric motor configured to be driven by the traction converter module.

2. An electric traction system according to claim 1, wherein the at least one electric motor comprises a multi-phase electric motor.

3. An electric traction system according to claim 2, wherein the plurality of AC-to-AC power converters comprise a first AC-to-AC power converter and a second AC-to-AC power converter, and wherein the output nodes of the first and second AC-to-AC power converters are configured to supply AC power to the multi-phase electric motor so as to drive the multi-phase electric motor.

4. An electric traction system according to claim 3, wherein the first and second AC-to-AC power converters have identical circuit topologies.

5. An electric traction system according to claim 3, wherein the multi-phase electric motor comprises a first set of stator windings and a second set of stator windings, and wherein the output nodes of the first AC-to-AC power converter are electrically coupled to the first set of stator windings, and the output nodes of the second AC-to-AC power converter are electrically coupled to the second set of stator windings.

6. An electric traction system according to claim 5, wherein the first set of stator windings and the second set of stator windings are electrically isolated from one another.

7. An electric traction system according to claim 5, wherein the first AC-to-AC power converter is configured to output a first number of phases of AC power at its output nodes, and wherein the first number of phases is identical to a number of phases of the first set of stator windings.

8. An electric traction system according to claim 1, wherein at least one of the plurality of AC-to-AC power converters comprises a rectifier, a DC-link capacitor and a power inverter.

9. An electric traction system according to claim 8, wherein one or each of the rectifier and the power inverter comprises at least one power semiconductor device.

10. An electric traction system according to claim 8, wherein the power inverter comprises a plurality of inverter legs connected between two ends of the DC link capacitor, and wherein the plurality of inverter legs provide the output nodes of the respective AC-to-AC power converter.

11. An electric traction system according to claim 9, further comprising a controller which is configured to control on and off statuses of the at least one power semiconductor device so as to convert the AC power received at the input nodes of the respective AC-to-AC power converter to the AC power at its output nodes during a traction mode of the traction system.

12. An electric traction system according to claim 11, wherein the controller is further configured to control on and off statuses of the power semiconductor devices of the respective AC-to-AC power converter so as to convert mechanical energy of the at least one electric motor to electrical energy at the secondary winding during a braking mode of the traction system.

13. An electric traction system according to claim 1, wherein at least one of the plurality of AC-to-AC power converters further comprises a bypass switch connected between the first and second input nodes of the respective AC-to-AC power converter.

14. An electric traction system according to claim 1, wherein the plurality of AC-to-AC power converters further comprise a redundant AC-to-AC power converter, and the redundant AC-to-AC power converter comprises a bypass switch connected between its first and second input nodes.

15. An electric traction system according to claim 13, wherein:
    the at least one electric motor comprises a multi-phase electric motor; and
    the multi-phase electric motor comprises a redundant set of stator windings, and the output nodes of the redundant AC-to-AC power converter are electrically coupled to the redundant set of stator windings.

16. An electric traction system according to claim 11, wherein the controller is configured to control on and off statuses of a bypass switch, and either:
    (i) at least one of the plurality of AC-to-AC power converters further comprises the bypass switch connected between the first and second input nodes of the respective AC-to-AC power converter; or
    (ii) wherein the plurality of AC-to-AC power converters further comprise a redundant AC-to-AC power converter, and the redundant AC-to-AC power converter comprises the bypass switch connected between its first and second input nodes.

17. An electric traction system according to claim 8, further comprising a pre-charge circuit electrically connected between the secondary winding and the traction converter module, wherein the pre-charge circuit is configured to charge the DC-link capacitor prior to normal operation of the traction converter module.

18. An electric traction system according to claim 1, wherein the transformer comprises a line frequency transformer.

19. An electric machine comprising an electric traction system according to claim 1.

20. An electric machine according to claim 19, wherein the electric machine comprises a vehicle.

21. A power electronics system, comprising an AC power supply and an electric traction system according to claim 1, wherein the primary winding is operatively coupled to the AC power supply.

22. A rail transit system, comprising: an AC power supply and a vehicle comprising an electric traction system according to claim 1, wherein the primary winding of the electric traction system is operatively coupled to the AC power supply.

* * * * *